United States Patent [19]

Prosen

[11] Patent Number: 4,483,471
[45] Date of Patent: Nov. 20, 1984

[54] CARGO CARRIER

[76] Inventor: Gildo G. Prosen, 5356 N. Washtenaw, Chicago, Ill. 60625

[21] Appl. No.: 459,323

[22] Filed: Mar. 3, 1983

[51] Int. Cl.³ .............................................. B60R 9/04
[52] U.S. Cl. .................................... 224/314; 224/325; 224/309
[58] Field of Search ............... 224/314, 309, 319, 311, 224/318, 320, 321, 322, 324, 325, 329, 330, 331

[56] References Cited

U.S. PATENT DOCUMENTS

| | | | |
|---|---|---|---|
| 2,641,396 | 6/1953 | Parr | 224/320 |
| 3,273,768 | 9/1966 | Duer | 224/319 X |
| 3,476,433 | 11/1969 | Windham, Jr. | 224/311 X |
| 3,495,750 | 2/1970 | Oliveira | 224/320 |
| 4,245,764 | 1/1981 | Kowalski et al. | 224/321 |

*Primary Examiner*—Steven M. Pollard
*Attorney, Agent, or Firm*—Brezina & Buckingham

[57] ABSTRACT

The invention relates to an automotive cargo carrier utilizing interlocking vertically offset tubular perimeter members and multiple intersecting tension members providing for a substantially rigid, yet resilient structure, and a system for cargo carriage utilizing various interchangeable elements.

14 Claims, 10 Drawing Figures

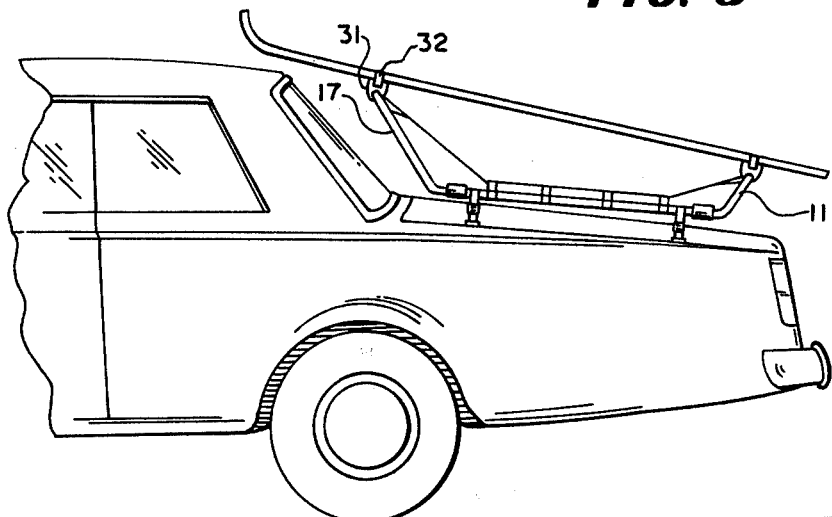
FIG. 3
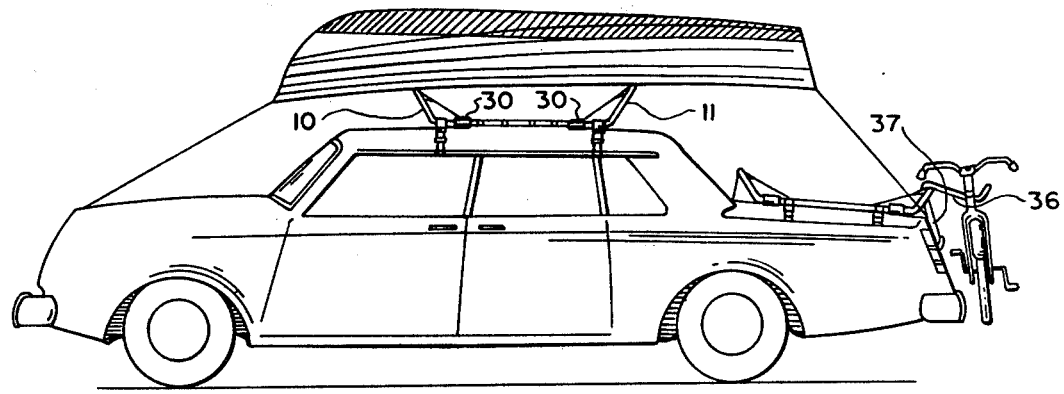
FIG. 4
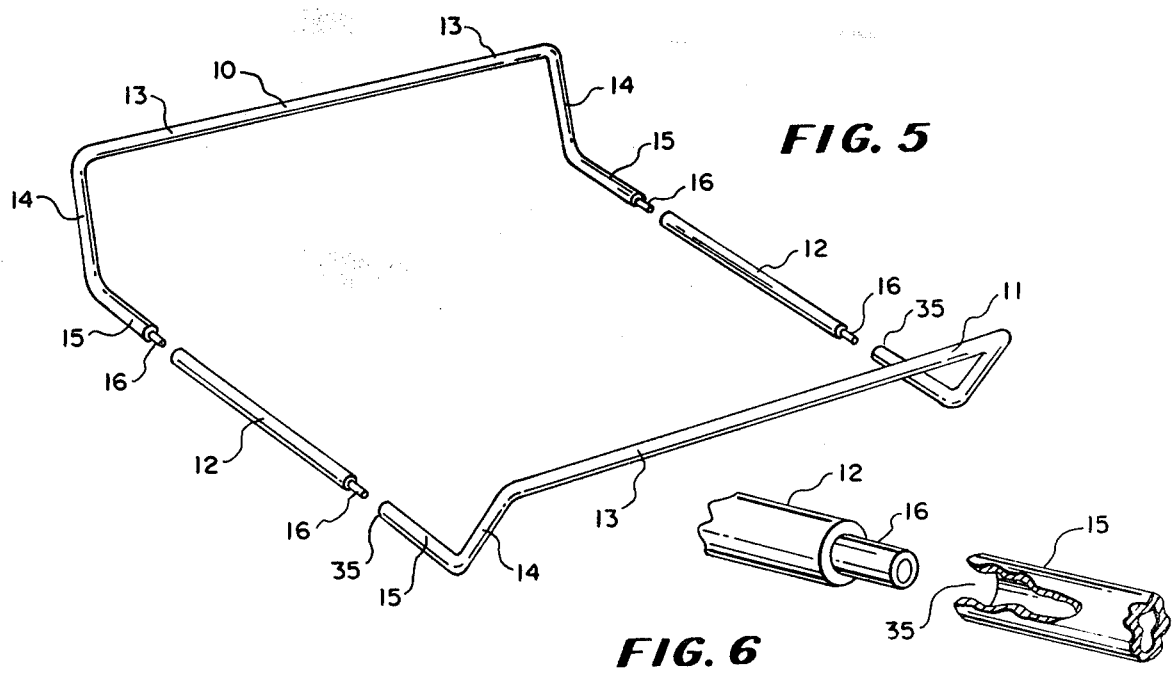
FIG. 5
FIG. 6

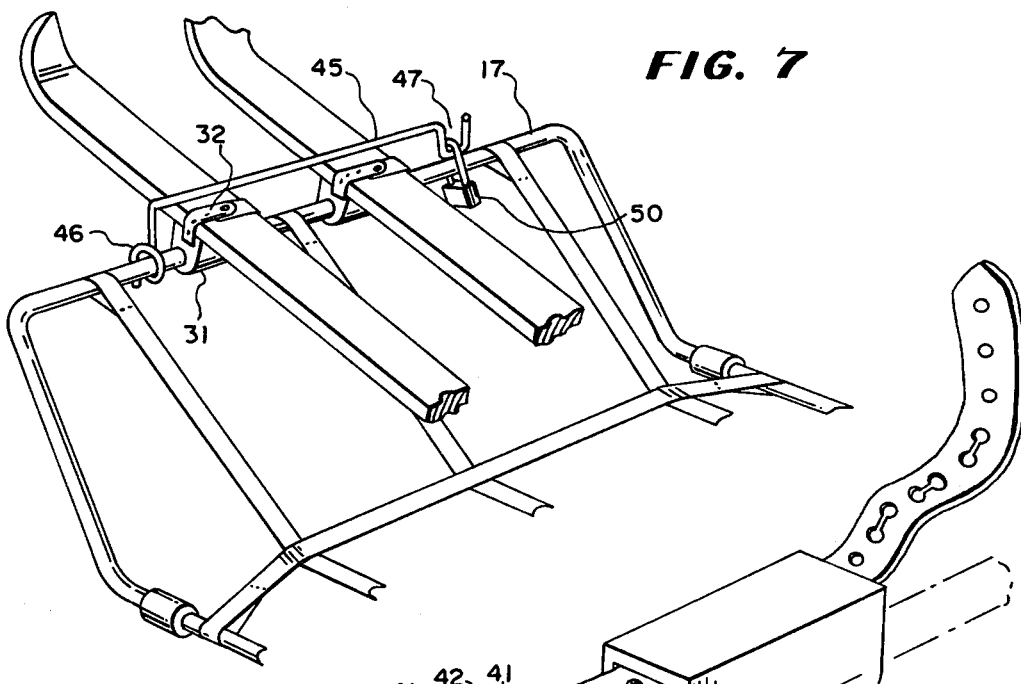
FIG. 7
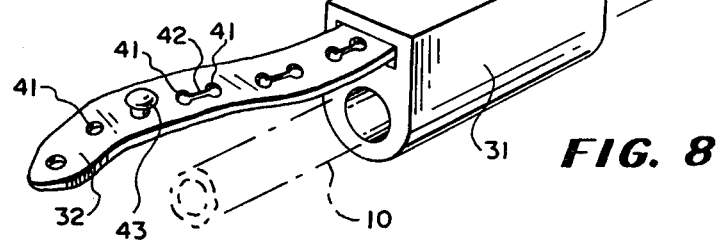
FIG. 8
FIG. 9
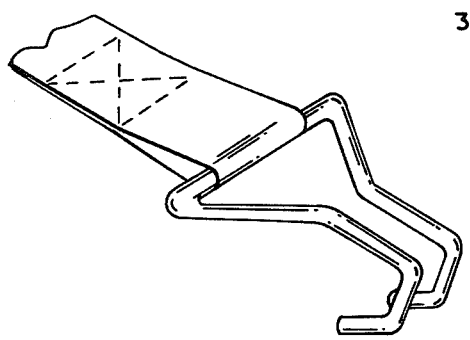
FIG. 10
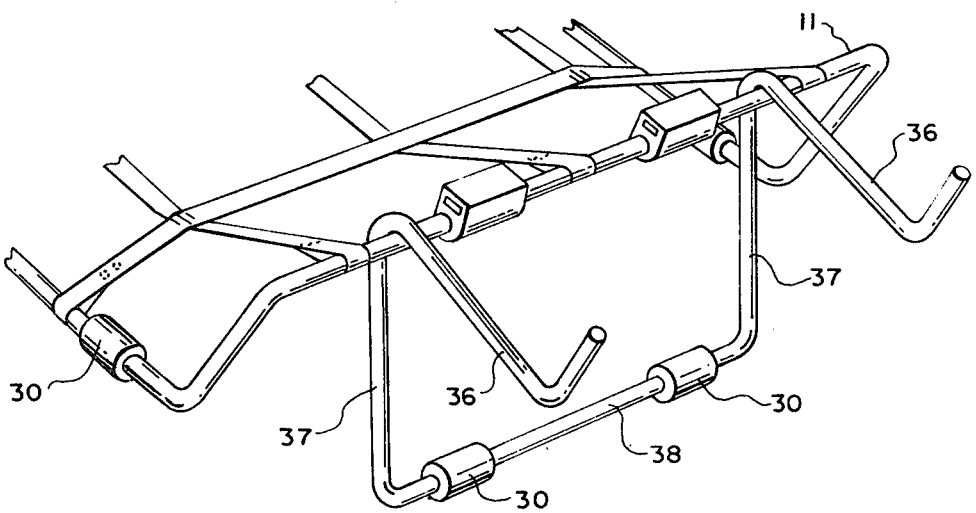

CARGO CARRIER

SUMMARY OF THE INVENTION

The invention incorporates numerous features found to be advantageous in the field of the affixation of cargo carrying devices upon automobiles and other vehicles.

One feature of the invention is its use of a series of interlocking tubular members forming a continuous tubular framework. The framework embodies both peripheral and support functions.

The tubular framework further utilizes members which have their axes aligned along a generally rectangular form. The corners of the generally rectangular form are formed through curved bends in the tubing.

The tubular members are further vertically displaced relative to their respective intersecting perpendicular members. This configuration yields a generally rectangular plan form with pairs of horizontal tubes, one pair being vertically displaced upwards from the other pair, each member of which is perpendicularly disposed to the corresponding member.

The invention further features a multiplicity of transverse and longitudinal straps which are flexible, yet resistant to stretching.

The series of straps include longitudinal straps with permanently sewn loops for engagement with the lateral tubular members. The series of straps further incorporates longitudinal straps utilizing loops and adjustable fasteners so that the tension on these sets of straps may be adjusted.

The straps are so arranged such that the straps fixed to the tubular members oriented at the lower portion vertically are bowed upward by the fitment of the adjustable straps mounted on the tubular members which are vertically disposed higher than their corresponding members. This arrangement provides for several advantages.

The utilization of the strap system for tensioning the structure enables assembly and ready disassembly since permanent fastening of the tubular members is unnecessary. This provides for both ease of manufacture and assembly by the user or purchaser, as well as ease of disassembly and storage.

A further advantage provided by the use of straps under tension is that these straps themselves substantially add to the overall strength of the structure as a whole. This addition in strength is substantially greater than would be expected from an untensioned structure utilizing the mere structural strength of the individual elements.

A further advantage provided is that the variable tension on the strap system enables their use as the load carrying member. It is further contemplated that in certain instances the vertically higher disposed tubular members may themselves be used as load bearing members. The strap system thus permits the utilization of alternative arrangements depending upon the cargo.

Yet another feature is the light weight and ease of mounting of the invention upon the roof, trunk, or other surface of an automobile or other vehicle. The device is mounted through a series of at least four straps utilizing adjustable tension fasteners and engagement members for fastening the structure to various structures utilized in vehicle body panels such as roof gutters, or edges of trunk or rear hatch panels. The structure further permits the addition of multiple additional engagement members forwardly and rearwardly oriented to prevent undesirable shift of loads when mounted upon a vehicle.

The ease of reorientation of the engagement means further permits the rotation of the entire structure through approximately 90 degrees, thus reorienting the prior vertically disposed tubular members from a transverse to a longitudinal position relative to the longitudinal centerline of the vehicle. This permits carriage of unusual loads directly supported by the webbing, such as sailboats, or rolls of carpeting, or the like. This is particularly suitable where there is a need for accommodating a curved bottom surface such as in the items of cargo mentioned.

The invention further contemplates the use of additional substructures such as mounting pieces for skis incorporating an interior cylindrical section for engagement with the tubular members with external support surfaces and provisions for engagement with separate straps or elastic bands for fastening. Another alternative accessory is the addition of a pair of interconnected, rearwardly extending hooks with support bars extending so as to engage with the substantially vertical rear panel of a vehicle, the basic structure being mounted at or near panel break from the horizontal to the vertical portion, this accessory being used for the carriage of bicycles hung off the rear of the vehicle.

Locking devices formed from suitable rod may be incorporated in such a way as to be readily affixed through mounting on the tubular members, yet provide for secure carriage of various items.

The invention further incorporates the use of elastomeric collars, or sleeves which are fitted over the tubular members which are vertically lower disposed. These sleeves provide several advantages. The sleeves, made of expanded elastomeric material provide for the protection of the finish of the vehicle from the tubular structure of the carrier. The high coefficient of friction of the elastomeric sleeves tends to minimize unwanted shifting of the structure under load. Finally, the thickness of the elastomeric sleeves which themselves support the entire load of the structure permits the structure to be raised above the surface of the vehicle a sufficient distance to accommodate the customary curvature of said surfaces.

The special purpose, flat-sided mounting sleeves for skis may also be used as general support sleeves when placed on longitudinal sections of the framework.

Other features and advantages of the invention will become further apparent.

DISCUSSION OF THE PRIOR ART

There are a number of categories of prior art cargo carriers for vehicles. Generally, these can be either those utilizing permanently mounted fixtures, or removable types. Among these two types certain features overlap and prior art devices are known which utilize permanent mounting of certain fittings and removable engagement of alternative carrier means.

Permanently mounted vehicle cargo carriers generally require the fastening of either brackets or load carrying members themselves, or the like, to a panel on the body of the vehicle. Certain disadvantages of these devices are related to the fastening itself. It is often undesirable for vehicle owners to have holes for bolts or screws put through body panels. Alternatives affixation using welding or adhesive each have disadvantages in both disturbance to the finish of the vehicle and certain negative effects to be structural integrity of the panel. A further disadvantage becoming more important recently is that of the undesirable effect on factors such as fuel mileage caused by the placement of aerodynamically inefficient structures in the exposed slipstream of the vehicle. Other disadvantages include the expense of both construction and mounting and the negative aesthetic factor.

Types of cargo carriers are known which utilize certain permanent affixations with removable stanchions or upright members, or other cargo carrying members. This tends to minimize the undesirable aesthetic effect and the detrimental aerodynamic effect; however, these utilize generally more costly manufacturing and affixation processes. These further incorporate all of the undesirable aspects of drilling or fastening into body panels.

A common problem with many types of prior art cargo carriers utilizing any type of fastening means is that of exposure to weather. In particular, exposure to snow, freezing rain, or the like, renders many fasteners virtually impossible to disconnect. Collection of lint and dust may cause similar problems. A related problem is that of corrosion which results from most common structural member joining methods, particularly when moisture builds up in joints.

Removable cargo carrying racks generally incorporate the feature of either affixation to certain body structures, such as rain gutters, or those which are resting directly upon the body panel. Each of these has its disadvantages, and other alternatives incorporate combinations of the two concepts. Probably the most common cargo carrier for vehicles of a temporary nature is that which utilizes clamps and a structural cross member. When used in pairs, these provide adequate structural support for many loads, such as lumber, ladders, boats, or skis or other relatively long materials. These devices are almost wholly ineffective for the carriage of luggage, or other smaller items. These types of devices further utilize only the structural strength of the cross pieces for support of the load. Apart from the potential problems from a weak cross piece is the substantial problem that the support ultimately is borne by vehicle components not primarily designed for load carrying, namely, the rain gutters. The aesthetic features of these types of cargo carriers are virtually nonexistent, although they do have the advantage of being removable.

Another type of cargo carrier is that which rests directly upon the body panel. These devices are essentially baskets or shelves upon which the cargo rests. In many instances these have greater utility than the rail types previously mentioned; however, these are frequently designed merely for the carriage of smaller items, such as luggage, and are unsuitable for larger loads, such as lumber, boats, or the like. These basket or shelf type carriers rely, for their structural strength, almost wholly upon the inherent structural strength of the individual components from which they are constructed. When constructed of such items as structural steel bars, angles or channels, or structural aluminum, they result in relatively heavy structures for a given load carrying strength. These further are most often permanently assembled and are, therefore, extremely unwieldy and difficult to store. These further have concomitant difficulties in manufacture and transport from the manufacturer to the point of sale. These types of devices are fastened customarily either directly to the vehicle roof rain gutter rails, or alternatively, utilizing support pads and straps, or the like, engaged with body panel edges or the rain gutters of a vehicle. There is a general inflexibility in the use of each of these types.

One final type of a recently developed cargo carrier is the limited special purpose cargo carrrier utilizing elastomeric custom made cargo supports and a system of straps for affixation to, e.g., the roof of a vehicle. These devices are of extremely limited utility in that they are especially designed for support of such items as snow skis, or engagement with the gunwales of inverted canoes. These devices, while lightweight and compact, are almost wholly impractical for any other than their specifically designed uses.

Variations of these general types of devices are used in many applications. Bicycle carriers are a common variation, utilizing a multiplicity of legs resting upon pads on a rear deck lid of a vehicle and being engaged, through a series of straps, to the edges of the body panel. The more specialized these types of cargo carriers become, the less their universality in that, e.g., bicycle carriers are very difficult to adapt, or require special adapters for conversion for carrying of other sporting devices such as skis or surfboards. Applicant has a previously pending application dealing with a carrier for supporting paraphernalia. Devices such as the subject of the previous application have limitations in the general carriage of cargo, whether it be lumber, luggage, or the like.

DESCRIPTION OF THE PREFERRED EMBODIMENT

The device incorporates essentially a group of four lengths of structural tubing. In the preferred embodiment steel tubing is utilized, but any structural tubing of appropriate strength, such as aluminum or plastic, may be sufficient. Generally four sections of tubing are utilized in the preferred embodiment. These include, in the preferred embodiment, generally lateral members and longitudinal members. The lateral members, or cross-tubes, are formed through bending into a generally downward section, and thence bent again into a longitudinal section at either end.

It should be noted that the orientation of the tubes and the use of longitudinal tubes is in the customary embodiment, but variations are generally not limited. An important element is the fact that the cross-tubes are manufactured in pairs, one with its longitudinally projecting elements swaged to a reduced diameter slightly less than the inside diameter of the tubing. The other paired cross-tube has its longitudinally projecting ends of a constant diameter. This provides for alternative direct engagement of the two cross-tubes at the user's option. There are certain advantages to this alternative embodiment.

The device has great flexibility in its orientation on the vehicle. Rotation through 90 degrees in a horizontal plane, or rotation through 180 degrees in a vertical plane may be desirable for certain loads. Re-location or addition of supplemental support sleeves and hold down straps readily aids this reorientation.

In the preferred embodiment a second pair of tubes is utilized. The longitudinal tubes incorporate one end swaged to a reduced diameter slightly smaller than the inside diameter of the tubing, while the other is of constant diameter. In this way it is provided so that the four tubes may be engaged to form an essentially continuous length of tubing.

Prior to this engagement, in the initial assembly of the device, the suppporing elastomeric sleeves are affixed to the longitudinally extending sections of the first pair of tubes. In addition, the looped ends of the longitudinal tensioning straps are also engaged. During the course of assembly the looped ends of the transverse straps are engaged and dispersed approximately equidistant from each other on the longitudinally projecting portions of the cross-tubes and on the longitudinal tubes. The number of transverse straps varies according to the length of the finished cargo carrier, which is itself dependent upon the length of the longitudinal tubing members. In addition, prior to the engagement of the tubing, the looped ends of the fastener ends for the longitudinal straps are engaged with the opposing one of the lateral tubes.

Finally, the loop ends of the fastener straps may also be engaged as desired, depending upon the number and location. As previously noted, where the device is to be disposed upon the rear deck of a vehicle, it is relatively simple to dispose supplementary forwardly located fastening means for engagement with the forward edge of a body panel. Similarly, depending upon the vehicle, there may well be a location for placement of the hooks utilized for engagement with body panels at a suitable location to prevent or minimize forward or rearward displacement of the load. The invention is not limited to any particular location of the engagement hook units, but instead contemplates a great flexibility dependent upon the particular application.

Upon placement of all desired loops for fastening of the necessary straps, the tubing structure may be assembled. As the structural integrity of the assembly is maintained by the straps, it is unnecessary for any adhesives or fasteners to be used to maintain the tubes in position relative to one another at their respective junctions. Assembly is a simple matter of engagement of the reduced diameter ends of the tubes with the standard diameter ends to which they mate. As noted, in various embodiments the size of the resultant load carrying device is essentially contingent upon the length of the longitudinal tubes. For applications in which limited area on the vehicle is available, such as on the rear deck lid of a compact or sports car, the lateral members may be engaged directly to one another at their longitudinally extending portions. On the other hand, where placement of the device is contemplated on a location such as the roof of a station wagon or a van, relatively long longitudinal straps, additional transverse straps, and any necessary engagement hook units are added. In this way an entire system utilizing many common components may be utilized by an owner who, perhaps owns two vehicles, thereby enabling the user to vary the cargo carrying unit to particular applications with minimum substitution of components.

Once engagement of the tubing members has been accomplished, the longitudinal straps are routed beneath each of the transverse straps and tension applied. One critical element in the invention is the use of tension straps of a flexible, yet inelastic composition. In the preferred embodiment polypropylene webbing is utilized. Any alternative equivalent strapping could be utilized, however, with the degree of load carrying strength contingent upon the inelasticity of the strapping. The feature of flexibility provides for the conformance of the straps to the load, and for the ready assembly and tensioning of the straps. The degree of inelasticity contributes to a relatively fixed, rigid structure, and support members resistant to a lessening of tension. Through the use of friction fasteners, or buckles, tension can be maintained for long periods. The system of tensional support straps contributes to a structure which is substantially stronger than would be expected through the inherent structural strength of the individual components.

In certain applications it may be desirable to alternate the crossing of the straps, add additional straps, or both.

In distinction to the transverse rail type of cargo carriers, the transverse raised tubing members in the instant structure are under a relatively constant stress, and the use of inelastic strapping more readily distributes stress no tonly throughout both the lengths of the members themselves, but also to a substantial degree to other parts of the structure. In the event the load is borne by the webbing system itself, a similar structural benefit is provided. As opposed to the prior art utilizing what is, in effect, a basket or shelf, the instant structure utilizes the straps under tension to distribute a load evenly between all of the structural elements, straps and tubing alike.

In addition to the substantial addition to the strength and dispersal of unusual localized stresses, the strapping system provides the advantage of maintaining the engaged tubing members in a constant position relative to one another. In this respect the compressive forces of the straps retain the tubing in position, as opposed to other alternative fastening means, such as used of screws or bolts, which merely resist a separating motion. Screws and bolts not only require the placement of engagement holes, which have numerous other structural disadvantages, but localized stresses develop in the event of forces tending to expand the structure. The use of straps further tends to transfer the weight of loads borne by the straps, or borne directly by the lateral tubing members into compressive forces tending to increasethe rigidity of the structure at the engagement points of the tubing.

Upon release of the tension on the lateral strapping members, disassembly is readily accomplished. As previously mentioned, the disassembly is of advantage both because of the ready substitutability and change in configuration, as well as ease of reassembly, storage, or for replacement of components in the event they fail or require substitution for other reasons.

Alternative substitute components include polymeric sleeves for the carriage of long, relatively flat items such as skis. These sleeves incorporate internal cylindrical openings for engagement with the tubes, while on their exterior are substantially flat along one side. Incorporated in this flat side are embedded straps, or alternatively, the placement of slots for the placement of straps which may be used as hold downs for the items carried. These straps may be of varied construction, using either elasticity or tensioning fasteners to hold the items carried.

The invention contemplates the use of elastic load retention straps which may be engaged with the flat-sided sleeves, or directly with the load carrying device. These straps incorporate primarily three elements. The elements are the elastic strap, the fastener, and fastener engagement openings. The preferred embodiment of these load retainer straps utilizes the elastic properties of the strap to hold the load in close relation to the load carrying device, to absorb vibration, and to provide ease of attachment, maintenance of the attached position, and ease of removal.

These last features are accomplished through the special relation between the configuration of the opening and the elastic properties of the strap. The openings comprise two circular apertures interconnected by a slot. Upon the application of linear tension along the strap the elastic properties result in the elongation of the apertures and the lateral distension of the walls of the slot, thereby permitting ease of engagement of the projecting fastener with the near aperture, sliding through the slit to the far aperture. Upon release of the tension the walls of the slit close to immediately proximate placement relative to each other, thereby preventing inadvertent release. The elastic properties further permit ready release.

These flat sided mounting sleeves may also be used to supplement or substitute for the generally cylindrical support sleeves. The placement of the flat sided sleeves on the lower tubular members and rotation so the flat surface provides a greater surface area, maximizing the coefficient of friction and distributing the load over a larger surface area.

One further notable feature developed in the reduction to practice of the invention is the design of a particular engagement hook. In the preferred embodiment, the hook used for engagement with vehicle body panels is constructed of an essentially stamped metal sheet configuration. This includes both an opening for engagement with the strap, and a flat hook portion providing for uniform distribution of the forces along as wide a dimension as possible on the body panel edge, or other engagement portion on the vehicle.

An alternative feature particularly useful as an accessory or a supplemental portion of the invention, is the construction of panel engagement hooks from formed rod. The formed rod is constructed in such a way as to have an engagement loop for engagement in the strap with a flat portion, and opposite the flat portion forwardly extending projections thence extended downward into forming a hook. The pair of forwardly extending projections, since they are formed from a rod, necessarily have a space between them which may be formed of a sufficient dimension to permit the addition or removal of this hook from a permanently sewn loop in the strap. This permits a multiple use from permanently sewn straps in that, given the alternative, they may be engaged directly on the tubing members without the permanent placement of a hook thereon. If, in an alternative embodiment an additional strap is necessary, for example to prevent load shifting forwardly or rearwardly, the strap may be utilized for a second purpose by the mere placement of the alternative embodiment's engagement hook thereon.

BRIEF DESCRIPTION OF THE DRAWINGS

FIG. 3 constitutes a plan view of the vertically displaced cross-tube embodiment.

FIG. 4 constitutes a plan view of two alternative embodiments in place upon a vehicle.

FIG. 5 constitutes one embodiment of a framework within the system.

FIG. 6 is an exploded cut-away view showing the junction end.

FIG. 7 is a perspective view of the vertically displaced cross-tube embodiment.

FIG. 8 constitutes a perspective view of the flat-sided sleeve.

FIG. 9 constitutes a perspective view of one of the formed rod engagement hooks used in one embodiment.

FIG. 10 is a further accessory.

DETAILED DESCRIPTION OF THE DRAWINGS

Figure 1:
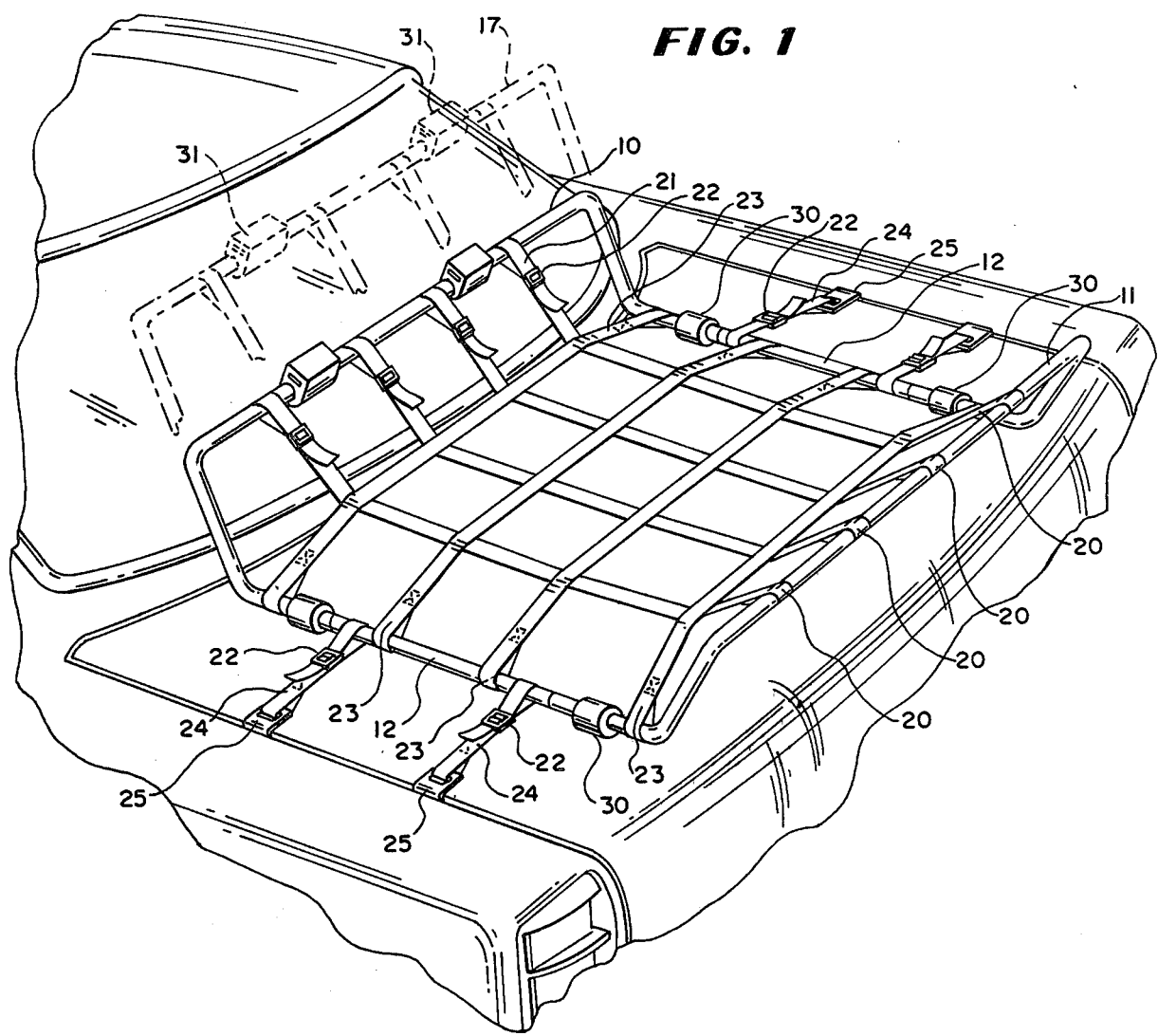
FIG. 1 constitutes a perspective view of the invention, installed on a vehicle.

FIG. 1 constitutes a perspective view of the invention, installed on a vehicle. Apparent in FIG. 1 is the narrowed engagement section cross-tube, 10, the straight diameter cross-tube, 11, and the longitudinal tubes, 12. A larger scale cut-away view of the intersection of the tubes is indicated and displayed in FIG. 6 below. Various other elements of the preferred embodiment are apparent in FIG. 1. The longitudinal straps, 20, which are in this view fastened to the looped ends of the fastener straps, 21, at the fasteners, 22. The longitudinal straps pass underneath the transverse straps, 23. In this embodiment hold down straps, 24, also incorporating fasteners, 22, are run through hooks, 25, for engagement with automobile body panels. Further apparent are the elastomeric sleeves, 30, in this embodiment placed on the longitudinal projecting legs of the cross-tubes.

An alternative configuration is shown in FIG. 1, in dashed lines utilizing alternative placement of elastomeric sleeves particularly adapted for carrying skis, or other substantially flat items or materials, said sleeves, 31. A further optional accessory is a vertically displaced narrowed engagement section cross-tube, 17, which provides for the raising of one end of a long load so as to provide clearance, for example, over the roof line of a vehicle, when the device is placed upon the rear deck of the vehicle.

Figure 2:
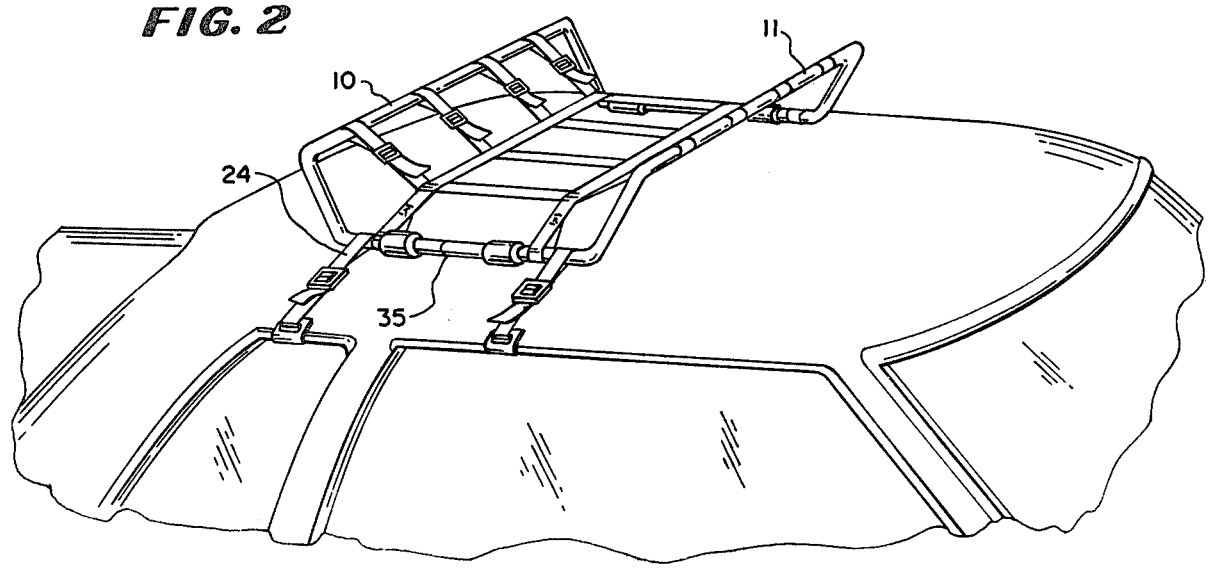
FIG. 2 constitutes a perspective view of another alternative embodiment of the invention.

FIG. 2 constitutes a perspective view of another alternative embodiment utilizing the system for the direct engagement of the cross-tubes, 10 and 11, at the engagement point, 35, thus resulting in a much narrower overall structure. In this embodiment the hold down strap, 24, is necessarily placed on the longitudinal sections of the cross tubes.

FIG. 3 constitutes a plan view of the vertically displaced cross-tube embodiment. The cross-tube section is shown at 17. In place on this cross-tube are flat-surfaced elastomeric sleeves, 31, designed for the support of skis, or the like. Said sleeves are provided with engagement slots for hold-down straps, 32.

FIG. 4 constitutes a plan view of two alternative embodiments in place upon a vehicle. The preferred embodiment is shown mounted to the roof of an automobile. The alternative embodiment incorporating the bicycle carrier fixture is shown mounted on the rear deck of the automobile. This latter embodiment is more fully displayed in FIG. 10.

FIG. 5 constitutes one embodiment of a framework within the system. In this embodiment short longitudinal sections, 12, are mounted between the cross-tubes, 10 and 11. In this view the straps have been eliminated, thus providing clarity and making the transverse sections of the crossbars, 13, downwardly extending sections, 14, and longitudinally extending sections, 15, more readily apparent. One end of each of the longitudinal tubes 12, and both ends of the narrow-ended cross-tube, 10, are narrowed at the junction, 16, so as to intersect with the straight engaged longitudinal sections of the longitudinal tubes, 12, and cross-tube, 11, at 35.

FIG. 6 is an exploded cut-away view showing the junction end, 16, of the longitudinal tube, 12, and its engagement in the straight gauge end of the cross-tube, 35.

FIG. 7 is a perspective view of the vertically displaced cross-tube embodiment. Apparent in this view are the cross-tube section, 17, the flat-sided elastomeric collars, 31, and load retention straps, 32. Further shown in this view is the load securing rod, 45, with its tube engagement section, 46 and its securing mechanism engagement section, 47. A padlock is shown as a securing mechanism, 50.

FIG. 8 constitutes a perspective view of the flat-sided sleeve, 31, of one of the alternative embodiments in which an elastic load retention strap, 32, has been engaged. Said elastic load retention strap, 32, in which the apertures, 41, and the slit, 42, are apparent, as is the fastener, 43, being generally cylindrical, with two enlarged heads.

FIG. 9 constitutes a perspective view of one of the formed rod engagement hooks used in one embodiment.

FIG. 10 a further accessory is a unit comprising rearwardly extending arms, 36, and downwardly extending legs, 37, merging into a horizontal crossbar, 38, which may be placed in engagement with the rearwardmost cross-tube, 11, the horizontal member of which intersects the rear of the vehicle, thus supporting the arms and permitting carriage of bicycles thereon.

In accordance with my invention, I claim:

1. A device for carrying loads comprising:
    a plurality of interengaging tubular members which form a continuous, generally rectangular perimeter means, one first pair of parallel sides of said perimeter means being generally disposed in a single plane, and the other pair of parallel sides of said perimeter means being vertically and upwardly displaced from said first pair, and disposed in either one or two planes parallel to the single plane of said first pair; and
    a means for placing said interengaging tubular members in compression, comprising at least two straps, a first strap being of predetermined length and engaging the first pair of parallel sides, and a second strap being of variable length and engaging said second pair of parallel sides, said straps being placed such that said first strap is on top of said second strap at their intersection;
    wherein, when said second strap is placed under tension, it causes said first strap to be bowed upwards and also placed under tension, and wherein placing said straps under tension thereby causes said perimeter means to be placed under compression and to become rigid.

2. A device as in claim 1, wherein each tubular member is of a reduced diameter at one end, said end of reduced diameter fitting into the full diameter end of another tubular member in order to interengage and form said continuous, rectangular perimeter means.

3. A device as in claim 1, comprising two interengaging tubular members, each having a straight section and two sections perpendicular to the straight section, said perpendicular sections being formed in a different plane from the straight section.

4. A device as in claim 1, comprising four interengaging tubular members, each member having a straight section and a section perpendicular to said straight section formed in a different plane.

5. A device as in claim 4, additionally comprising two straight tubular members, each forming part of an opposite side of the perimeter means, and each interposed between two tubular members comprising straight and perpendicular sections.

6. A device as in claim 1, additionally comprising fastening means for affixing said device to a vehicle.

7. A device as in claim 6, wherein at least two said fastening means are provided, each comprising a hook for engaging a panel of the vehicle; a strap of variable length engaging said hook, said strap also engaging a tubular member making up a first parallel side, and a strap retaining means for adjustment of strap length; said hook comprising two substantially parallel panel engagement means, the distance between the panel engagement means being of a dimension equal to the thickness of said strap and substantially less than the width of said strap.

8. A device as in claim 1, additionally comprising load support means engaged with a tubular member comprising an upwardly displaced side of said perimeter means.

9. A device as in claim 8, wherein at least one pair of load support means is provided, each having a cylindrical portion for engaging a tubular member, and one flat exterior surface.

10. A device as in claim 9, additionally comprising load locking means.

11. A device as in claim 10, wherein said load locking means comprises an elastomeric strap passing through said load support means, a fastener passing through said strap, and at least one fastener engagement and disengagement means in said strap comprising a pair of apertures interconnected by a linear slit passing through the strap.

12. A device as in claim 1, further comprising interchangeable component pieces for varying the vertical displacement of said other pair of parallel sides.

13. A device for carrying loads comprising:
    four interengaging tubular members which form a continuous, generally rectangular perimeter means, one first pair of parallel sides of said perimeter means being generally disposed in a single plane, and the other pair of parallel sides of said perimeter means being vertically and upwardly displaced from said first pair, and disposed in either one or two planes parallel to the single plane of said first pair;
    a means for placing said interengaging tubular members in compression, comprising at least two straps, a firststrap being of predetermined length and engaging the first pair of parallel sides, and a second strap being of variable length and engaging said second pair of parallel sides, said straps being placed such that said first strap is on top of said second strap at their intersection;
    wherein when said second strap is placed under tension, it causes said first strap to be bowed upwards and also placed under tension, and wherein placing said straps under tension thereby causes said perimeter means to be placed under compression and to become rigid;
    each said tubular member having a straight section and a section perpendicular to said straight section formed in a different plane;
    fastening means for affixing said device to a vehicle; and
    load support means engaged with a tubular member making up an upwardly displaced side of said perimeter means.

14. A device in kit form for carrying loads comprising:

a plurality of tubular members adapted to be interengaged to form a continuous, generally rectangular perimeter means, one first pair of parallel sides of said perimeter means being generally disposed in a single plane and the other pair of parallel sides of said perimeter means being vertically and upwardly displaced from said first pair, and disposed in either one or two planes parallel to the single plane of the first pair; and a means adapted for placing said tubular members when interengaged in compression, comprising at least two straps, a first strap being of predetermined length and adapted to engage the first pair of parallel sides, and a second strap being of variable length and adapted to engage said second pair of parallel sides, said straps adapted to be placed such that said first strap is on top of said second strap at their intersection;

wherein, when said second strap is placed under tension it causes said first strap to be bowed upwards and also placed under tension, and wherein placing said straps under tension thereby causes said perimeter means to be placed under compression and to become rigid.

* * * * *